(12) United States Patent
Yamashita

(10) Patent No.: US 6,380,891 B1
(45) Date of Patent: Apr. 30, 2002

(54) GPS RECEIVER WITH SATELLITE FRAME SYNCHRONIZATION PROCESS

(75) Inventor: Yuzo Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/534,345

(22) Filed: Mar. 24, 2000

(30) Foreign Application Priority Data

Apr. 5, 1999 (JP) ............................................. 11-097713

(51) Int. Cl.$^7$ .............................. G01S 1/02; G01S 1/00; G01S 5/00; G01S 5/02; G01S 5/14; G01S 5/22; G01S 5/26; G01S 5/30; H04B 7/185

(52) U.S. Cl. ............................ 342/357.15; 342/357.06; 342/357; 342/356; 342/457; 342/458; 342/387; 342/463-465; 701/200-215; 370/329; 370/330; 370/336; 370/343; 370/344; 370/380; 375/219; 375/222; 375/377; 375/324; 375/334; 340/572; 340/990; 340/995; 340/998

(58) Field of Search ............................ 342/357.06, 357, 342/457, 458, 387, 356, 357.15, 463–465; 370/329, 330, 336, 343, 344, 380; 701/200–215; 340/572, 990, 995, 998; 375/219, 222, 377, 324, 334; 364/449.7, 449.8, 449.9, 450, 484, 460, 459, 726

(56) References Cited

U.S. PATENT DOCUMENTS 4,445,118 A * 4/1984 Taylor et al. ................ 343/357
5,689,431 A * 11/1997 Rudow et al. ............ 364/449.7
5,694,416 A * 12/1997 Johnson ....................... 375/206
5,726,893 A * 3/1998 Schuchman et al. ...... 364/449.7
5,808,582 A * 9/1998 Woo ............................ 342/357
5,893,044 A * 4/1999 King et al. .................. 701/214
6,184,824 B1 * 2/2001 Bode et al. ............. 342/357.15

FOREIGN PATENT DOCUMENTS

| JP | 63-122976 | 5/1988 |
|---|---|---|
| JP | 5-157826 | 6/1993 |
| JP | 6-112871 | 4/1994 |

* cited by examiner

Primary Examiner—Jacques H. Louis-Jacques
Assistant Examiner—Ronnie Mancho
(74) Attorney, Agent, or Firm—Law Offices of David G. Posz

(57) ABSTRACT

A GPS receiver has a plurality of data demodulator circuits assigned to a plurality of GPS satellites, respectively, and a data memory which stores detailed orbit information of the GPS satellites. The GPS receiver searches for satellites the detailed orbit information of which was stored in the memory previously. When these searched GPS satellites are acquired, the GPS receiver executes satellite frame synchronization determination processing to check for an agreement among predetermined data included in satellite data transmitted from the acquired GPS satellites. When the searched GPS satellites cannot be acquired or the predetermined data do not agree, the GPS receiver executes a single-satellite frame synchronization determination processing to check for an agreement of predetermined data included in a plurality of frames of the satellite data. The GPS receiver starts positioning processing in response to an establishment of agreement to calculate its position.

11 Claims, 6 Drawing Sheets

GPS RECEIVER WITH SATELLITE FRAME SYNCHRONIZATION PROCESS

CROSS REFERENCE TO RELATED APPLICATION

This application relates to and incorporates herein by reference Japanese Patent Application No. 11-97713 filed on Apr. 5, 1999.

BACKGROUND OF THE INVENTION

The present invention relates to a GPS receiver which receives radio signals from GPS (global positioning system) satellites and detects its position from the received radio signals.

The GPS signals are widely used to detect positions of moving bodies such as automotive vehicles. Specifically, a GPS satellite in the air is searched for from the present time and the present position of a GPS receiver mounted on an automotive vehicle. The signal reception frequency is estimated from the orbit information of the GPS satellite in consideration of influence of Doppler effect. If three or more GPS satellites thus searched for are acquired, it becomes possible to execute a positioning processing, that is, to calculate the position of the automotive vehicle by using satellite orbit data included in GPS signals (satellite data) transmitted from the acquired GPS satellites.

It is necessary to synchronize the positioning processing with the satellite data. That is, time data included in the satellite data is extracted, and the distance between the satellite and the GPS receiver is calculated based on the extracted time and the present time of the GPS receiver. The position of the GPS satellite is calculated from the detailed orbit information (ephemeris) included in the satellite data. This positioning processing is executed with respect to three (preferably four) satellites, so that the present position of the automotive vehicle may be calculated from the position and data transmission time of each satellite.

The detailed orbit information is generally effective for about four hours. It is therefore not necessary to newly collect the detailed orbit information even when a power supply to the GPS receiver is shut down for a short period of time, as long as the detailed orbit information is stored in a backup memory provided in the GPS receiver. As a result, the GPS receiver is enabled to restart the positioning processing immediately from its power-on after the short power-off period, because it is only necessary for the GPS receiver to extract time information from the satellite data. This operation-restarting is generally referred to as a hot start. It is however still necessary to synchronize the positioning processing of the GPS receiver with the satellite data, when the time information is to be extracted in the hot start processing. That is, it is necessary to accurately determine the start point of the satellite data.

The satellite data is generally formatted to have five sub-frames in one frame. One sub-frame (6 seconds) includes ten words. The head word in each sub-frame is a TLM word, and the following word is a HOW (hand-over word). Thus, TLM and HOW appear every 6 seconds which is a time interval of each sub-frame during transmission of data.

It is necessary to check synchronization of data with respect to each sub-frame for the positioning processing of the GPS receiver. That is, it is necessary to check a preamble code provided in the TLM included at the head of the sub-frame, a sub-frame ID (identification code) and parity included in HOW, and the like. As a result, the synchronization determination processing of each frame takes at least 6 or more seconds which corresponds to one sub-frame. That is, the check is executed by retrieving the preamble code and the parity which appear every 6 seconds. In this instance, retrieving TLM and HOW takes 1.2 seconds, because one word corresponds to 0.6 second. Thus, it takes at least 7.2 seconds to retrieve the preamble codes and the parities of two frames for checking agreement of data included in the satellite data transmitted from each GPS satellite.

SUMMARY OF THE INVENTION

It is therefore an object of the present invention to provide a GPS receiver which is capable of synchronizing its positioning processing with satellite data thereby to shorten a time period required to start the positioning processing.

According to the present invention, a GPS receiver executes satellite frame synchronization determination processing to establish a synchronization of satellite data transmitted from a plurality of GPS satellites. Specifically, in the satellite frame synchronization determination processing, it checks an agreement among predetermined data included in the transmitted satellite data, when the plurality of GPS satellites the detailed orbit information of which are stored in a memory are acquired with in a predetermined time period.

Preferably, the GPS receiver executes a single-satellite frame synchronization determination processing, when it cannot establish the satellite frame synchronization or when it cannot acquire the plurality, of GPS satellites the detailed orbit information of which are stored in the memory cannot be acquired with in the predetermined time period. In the single-satellite frame synchronization determination processing, the GPS receiver checks for an agreement among predetermined data of a plurality of frames included in the satellite data transmitted from a predetermined one of the satellites and for establishing a frame synchronization of the satellite data.

Further preferably, the GPS receiver stores a general orbit data extracted from the satellite data and a present position, and searches for the GPS satellites based on the stored general orbit data, the present position and present time.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
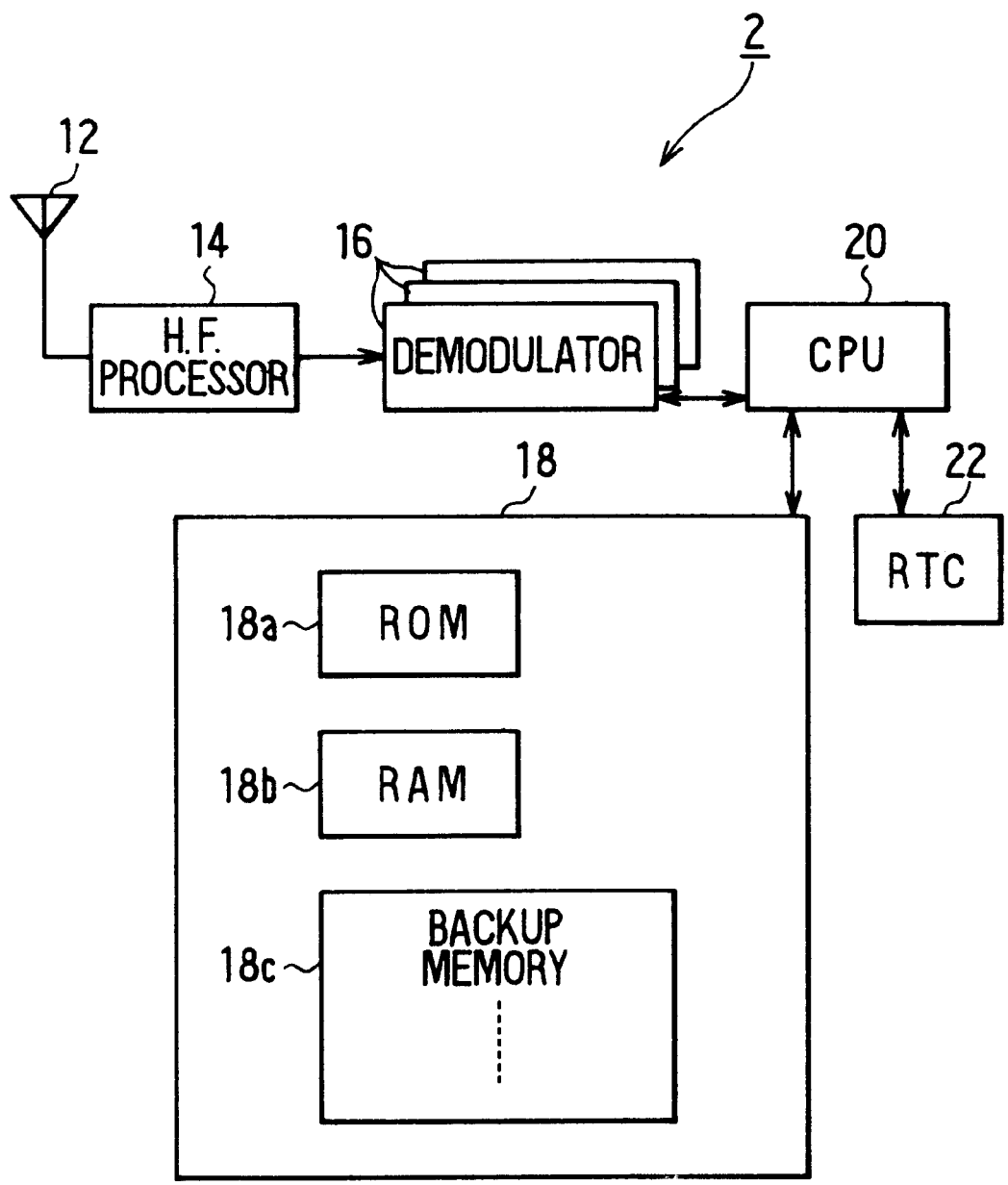
FIG. 1 is a block diagram showing a GPS receiver according to an embodiment of the present invention.

Referring first to FIG. 1, a GPS receiver 2 has an antenna 12 for receiving radio signals from a plurality of GPS satellites (not shown), a high frequency processor circuit 14, data demodulator circuit 16, a memory unit 18, a central processor unit (CPU) 20, and a real time clock (RTC) 22.

The high frequency processor circuit 14 amplifies the radio signals received from the GPS satellites by the antenna 12, and converts the received signals of high frequency into corresponding signals of medium frequency lower than the high frequency. The data demodulator circuit 16 has eight channels so that the radio signals transmitted from a maximum of eight GPS satellites may be demodulated separately or in parallel.

The memory unit 18 includes a ROM 18a storing programs for executing various processing of the CPU 20, a RAM 18b storing variables used in the positioning processing, and a backup RAM 18c storing the received satellite data and positioning data even when a power supply is shut down. The received satellite data include detailed orbit information (ephemeris), general orbit information (almanac) and the like.

Figure 5A:
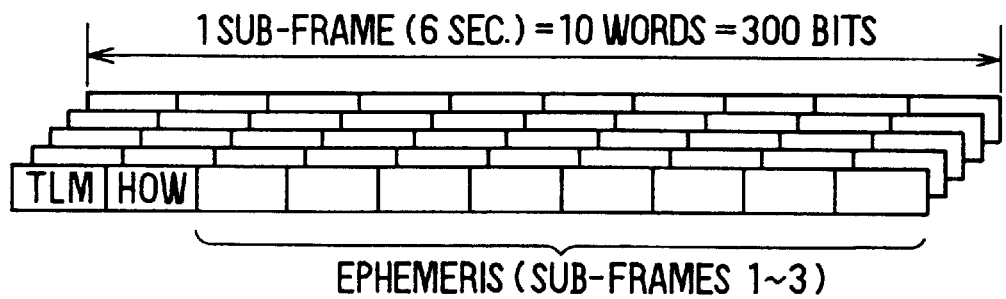
FIGS. 5A to 5C are diagrams showing format of satellite data.
Figure 5B:
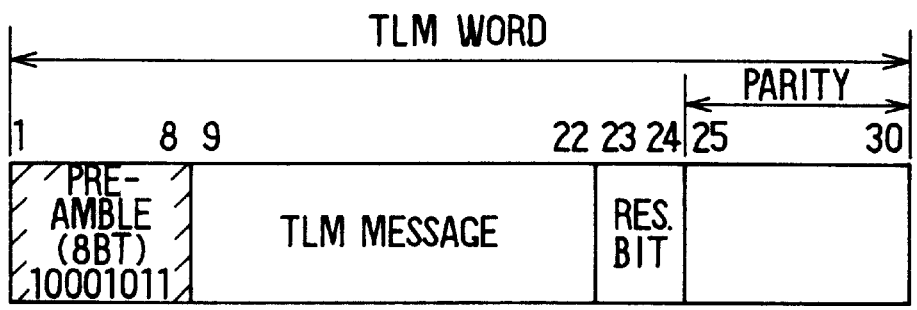
Figure 5C:
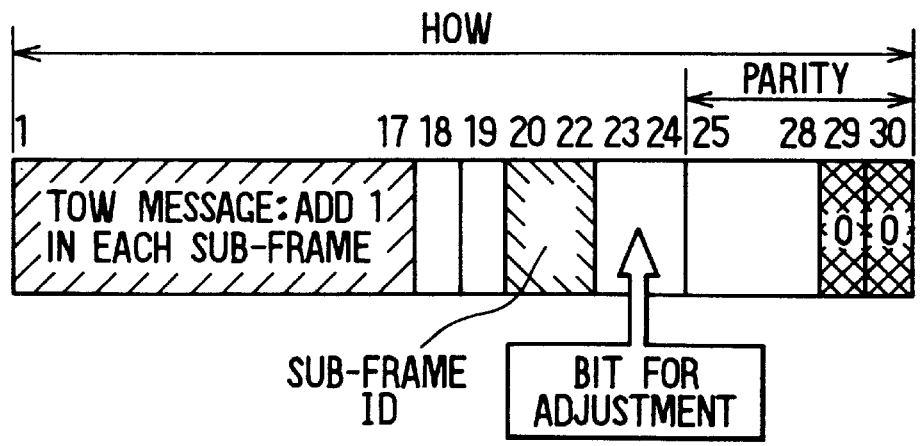

Each satellite data is for matted as shown in FIGS. 5A to 5C. Specifically, the satellite data is transmitted every 30 seconds. As shown in FIG. 5A, its one frame (30 seconds) is comprised of five sub-frames, and each sub-frame (6 seconds) is comprised of ten words (300 bits). The head word of each sub-frame is a TLM word, and the following word is a HOW (hand-over word). The remaining words are detailed orbit information (ephemeris) in the first to third sub-frames and the general orbit information (almanac) and other information in the fourth and fifth sub-frames, respectively.

The TLM word has, at the head thereof, a preamble code (8 bits in hexadecimal) which is a head indication code of the sub-frame, as shown in FIG. 5B. The preamble code is followed by the TLM message, reservation bit, parity and the like. HOW has, at the head thereof, a TOW message which defines the time of transmission of the sub-frame and is incremented by one, as shown in FIG. 5C. The TOW message is followed by a sub-frame ID, adjustment bit, parity and the like. The parity in HOW is comprised of six bits from 25th-bit to 30th-bit. The 29th-bit and $30^{th}$-bit are constantly set to "0". The adjustment bit is for setting the $29^{th}$-bit and the 30th-bit.

Figure 2:
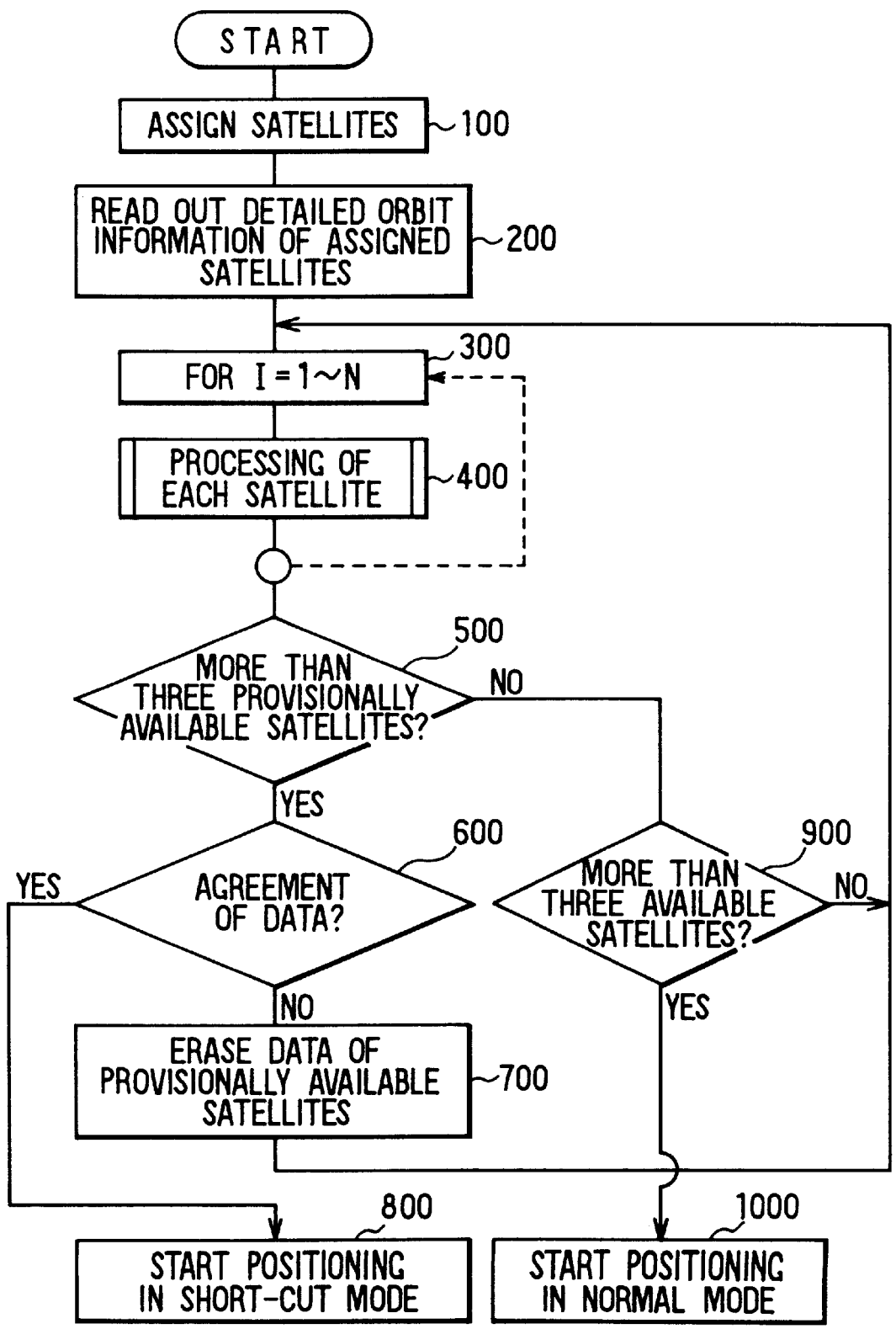
FIG. 2 is a flow diagram showing a GPS data reception processing of the GPS receiver shown in FIG. 1.
Figure 3:
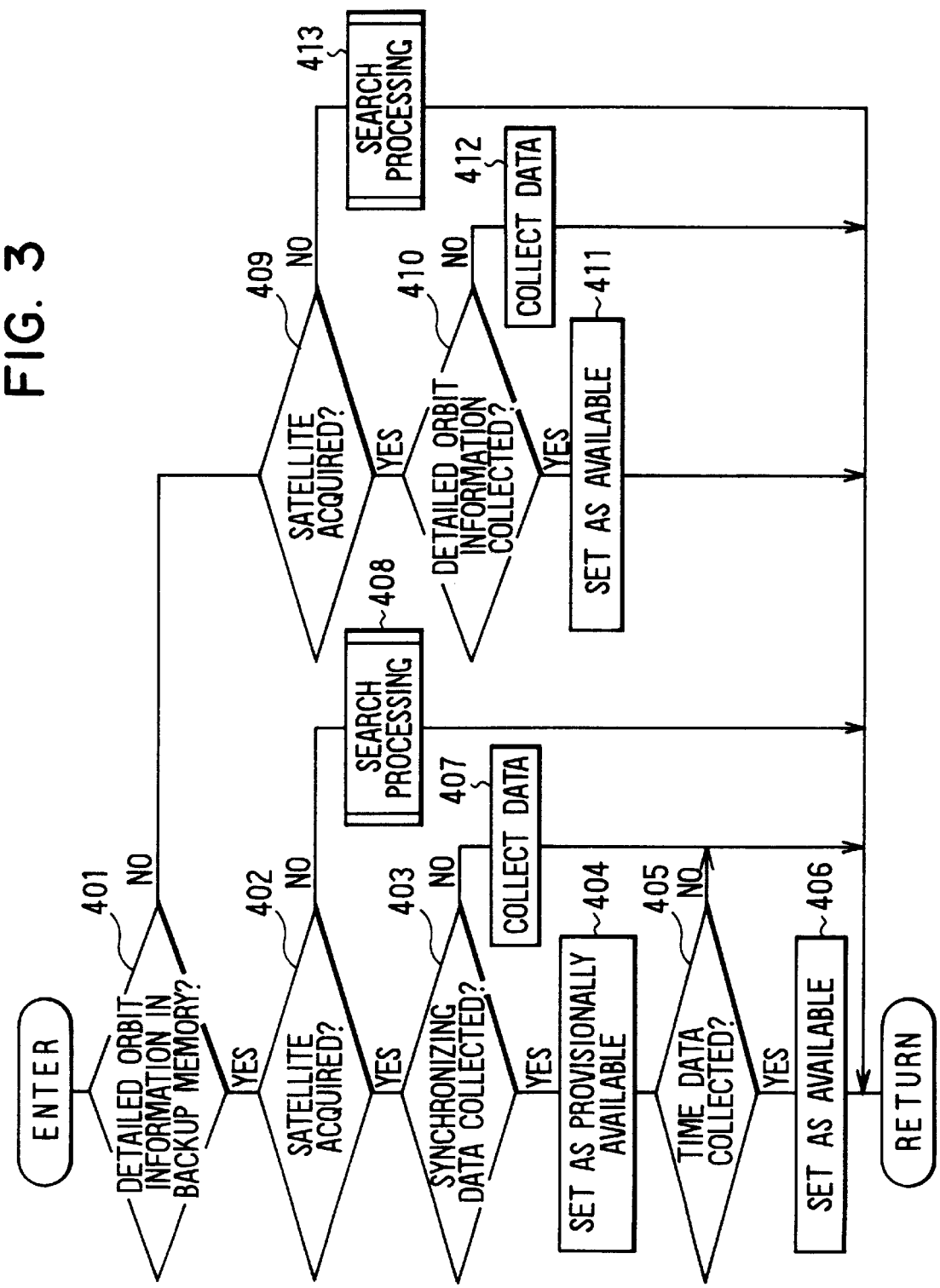
FIG. 3 is a flow diagram showing processing of each satellite executed in the GPS data reception processing shown in FIG. 2.
Figure 4:
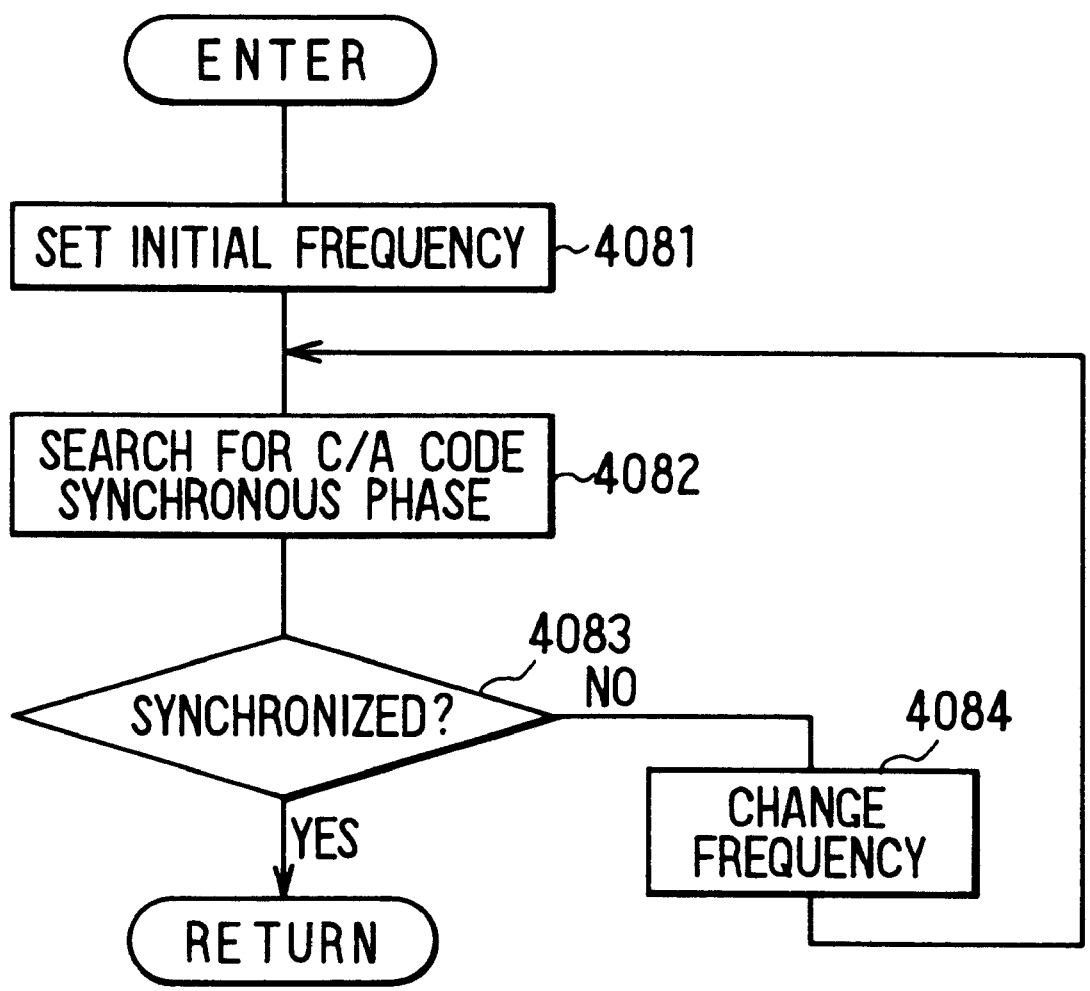
FIG. 4 is a flow diagram showing processing of satellite acquisition executed in the processing shown in FIG. 3.

The GPS receiver 2, particularly the CPU 20, is programmed to execute the processing shown in FIGS. 2 to 4. The CPU 20 starts to execute the processing shown in FIG. 2 when the power is supplied.

The CPU 20 first assigns GPS satellites to be acquired to channels CH0 to CH7 of the data demodulator circuit 16, respectively, at step 100. That is, the channels CH0 to CH7 are assigned to the GPS satellites which are expected to appear above the GPS receiver 2, respectively. Those satellites are determined from the present time of RTC 22, the general orbit information (almanac) stored in the backup memory 18c and the position of satellite (rough present position) which were acquired last time during the operation of the GPS receiver 2 and stored in the backup memory 18c. That is, each satellite is determined by calculating the angle of elevation. Those satellites will be estimated with out substantial error, as long as the GPS receiver 2 was not moved after the power supply to the GPS receiver 2 was shut down and the time of the RTC 22 is generally correct. The number of GPS satellites to be searched for and acquired may be less than eight.

The CPU 20 then reads out or retrieves, at step 200, the detailed orbit information of the GPS satellites which are assigned as above, if such information is stored in the backup memory 18c as a result of the previous operation of the GPS receiver 2. The detailed orbit information of all GPS satellites may be available in some cases, but only of some GPS satellites or none may be available in other cases.

The CPU 20 then executes satellite acquisition processing at steps 300 and 400 with respect to each channel (each satellite I=1 to N to be acquired). That is, GPS satellite acquisition and data collection are executed with respect to each of I=1 to I=N in sequence at step 400 as shown in FIG. 3.

The CPU 20 checks at step 401 whether the detailed orbit information of the GPS satellite is held stored in the backup RAM 18c. If it is stored (YES), the CPU 20 checks at step 402 whether the GPS satellite was acquired. If it was not acquired yet (NO) the CPU 20 executes a satellite search processing at step 408. This search processing is shown in FIG. 4 in detail.

The CPU 20 first sets the satellite frequency to a predicted frequency at step 4081. Here, the frequency of a carrier signal (reception frequency f0) to be received from each GPS satellite to be acquired is calculated. The reception frequency f0 is also calculated from the present time of RTC 22, the general orbit information (almanac) stored in the backup memory 18c and the position of GPS receiver (rough present position) which were acquired last time during the operation of the GPS receiver 2 and stored in the backup memory 18c, in the same manner as the angle of elevation is calculated.

The CPU 20 then searches for a C/A code synchronous phase at step 4082. Navigation messages are transmitted from the GPS satellite as a spread spectrum signal. The C/A code is one of codes used to modulate the navigation message, and is composed of 1023 bits of "1" and "0" arranged in a predetermined manner. Each of these "1" and "0" is called a chip. It is necessary to detect in which phase the C/A code is carried on the carrier wave. For this purpose, a C/A code which is in the same type as the C/A code of the satellite to be acquired is generated in the data demodulator circuit 16, and a value of correlation between the generated C/A code and the received spread spectrum signal is calculated while changing the phase of the C/A code generated in the data demodulator circuit 16.

The CPU 20 checks at step 4083 whether both signals are synchronized. If both are in the synchronous relation (YES), the processing advances to step 500 in FIG. 2. If both are not in the synchronous relation (NO), the CPU 20 changes the reception frequency at step 4084. In changing the reception frequency, the frequency is increased to a little higher frequency f1 which is about 1 kHz higher than the reception frequency f0 set initially at step 4081. If both signals cannot be still synchronized, the reception frequency is decreased to a little lower frequency f2 which is about 1 kHz lower than the reception frequency f0. If both signals cannot be synchronized either, it is increased to a still higher frequency f3 which is higher than the frequency f1. It will be preferred to repeat the above search periodically from the initially set reception frequency f0 again, if the changed frequency deviates to o much from the reception frequency f0.

As described above, in the satellite search processing step 408 in FIG. 3 and FIG. 4, the reception frequency of each satellite is estimated, the phase of the C/A code is checked with respect to each estimated reception frequency, and the reception frequency is changed if not synchronized. Thus, searching for the carrier frequency and searching for the synchronous phase of the C/A code are executed in parallel, that is, at the same time, with respect to a plurality of GPS satellites.

Referring to FIG. 3 again, the CPU 20 checks at step 403 whether synchronization data for establishing a synchronization was collected, if it is determined at step 402 that the satellite was acquired (YES). Here, the synchronization data includes the preamble code in the TLM word, and TOW message, sub-frame ID and 29-th and 30-th bit parity (=0) in HOW. Those are included in the satellite data format as shown in FIGS. 5A to 5C. It is also checked whether all the parity in TLM and HOW is correct or normal.

If the synchronization data was not yet collected (NO), the CPU 20 collects the data at step 407. If the synchronization data was collected (YES), the CPU 20 determines at step 404 that this GPS satellite is provisionally available for positioning processing. This determination is stored in the RAM 18a as a provisional availability flag of the corresponding GPS satellite.

It may occur that the positioning processing cannot be initiated at the earliest possible time through satellite frame synchronization processing. Therefore, the CPU 20 executes single-satellite frame synchronization processing. That is, it checks at step 405 whether the time data was collected. If the time data was collected (YES), the CPU 20 now determines at step 406 that the GPS satellite is available for the positioning processing. This determination is stored in the RAM 18a as a final availability flag. If not collected yet (NO), the CPU 20 repeats steps 300 and 400.

If the CPU 20 determines at step 401 that the detailed orbit information of the corresponding GPS satellite is not stored in the backup memory 18c (NO), it then checks at step 409 whether the GPS satellite was acquired. If the satellite was not acquired yet (NO), the CPU 20 executes at step 413 the satellite search processing in the same manner as executed at step 408 (FIG. 4).

If the satellite was acquired (YES), the CPU 20 checks at step 410 whether the detailed orbit information was collected. If such information was not collected yet (NO), the CPU 20 continues to collect it at step 412. If it was collected (YES), the CPU 20 determines at step 411 that this GPS satellite is available for positioning processing.

After the above processing (steps 300 and 400 in FIG. 2) with respect to each GPS satellite, the CPU 20 checks at step 500 whether there are at least three GPS satellites which are determined as available for the positioning processing at step 400. If at least three GPS satellites are available (YES), the CPU 20 checks at step 600 whether the synchronization data (preamble code in TLM word, and TOW message, sub-frame ID and 29th-bit and 30th-bit parity (=0) in HOW) among the GPS satellites which are determined as provisionally available agree.

If the synchronization data do not agree (NO), the CPU 20 erases at step 700 the detailed orbit information of such provisionally available GPS satellites from the backup memory 18c. In this instance, the flags indicating the provisional availability and stored in the RAM 18a are also erased. The CPU 20 executes steps 300 and 400 again after step 700.

If the synchronization data agree (YES), the CPU 20 starts the positioning processing at step 800 to start calculating the position of the GPS receiver 20 in an abbreviated or short-cut mode. That is, it is determined that the frame synchronization was established among the acquired GPS satellites to proceed to the positioning processing in short-cut when the synchronization data of at least three GPS satellites agreed. In this short-cut positioning processing for calculating the present position of the GPS receiver 2, the detailed orbit information stored in the backup memory 18c may be used with out waiting for the transmission of the same from the GPS satellites.

If it is determined at step 500 that there are less than three GPS satellites determined as provisionally available (NO), on the other hand, the CPU 20 further checks at step 900 whether there are three or more GPS satellites which were determined as finally available. If there are less than three available GPS satellites (NO), the CPU 20 executes steps 300 and 400 again.

If there are at least three GPS satellites determined as finally available (YES), the CPU 20 starts the positioning processing at step 1000 in a normal mode. That is, it is checked whether the synchronization data provided at the heads of a plurality of sub-frames of the same satellite agree. If the data agrees, it is determined that the frame synchronization is established, so that the positioning processing is executed.

As described above, the GPS receiver 2 is enabled to execute the "hot start" processing by storing the detailed orbit information extracted previously. Even in this instance, it is necessary to synchronize the operation of the GPS receiver 2 with the satellite data to extract the time information from the satellite data. Therefore, it is determined that the synchronization was established when the frame synchronization of each satellite was established as a result of processing of each satellite executed with in a predetermined time period. Specifically, the frame synchronization is determined as established, when three or more available GPS satellites (specifically satellites the detailed orbit information of which are stored and the synchronization data of which was collected) are acquired (YES at step 500) and the respective synchronization data of such satellites agree (YES at step 600).

With the execution of the above satellite frame synchronization determination processing, the frame synchronization can be realized at the earlier time than in the single-satellite frame synchronization determination processing which is executed conventionally with respect to the predetermined data transmitted from the same satellite. In the conventional processing, the frame synchronization is established by checking agreement among predetermined data of a plurality of frames constituting satellite data transmitted from the same satellite.

Figure 6A:
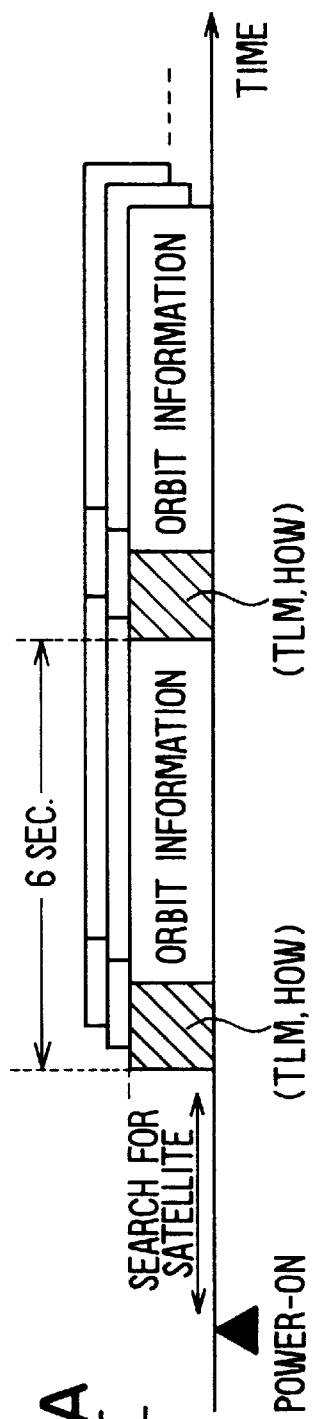
FIGS. 6A and 6B are timing diagrams showing operations of a conventional GPS receiver and the embodiment, respectively.
Figure 6B:
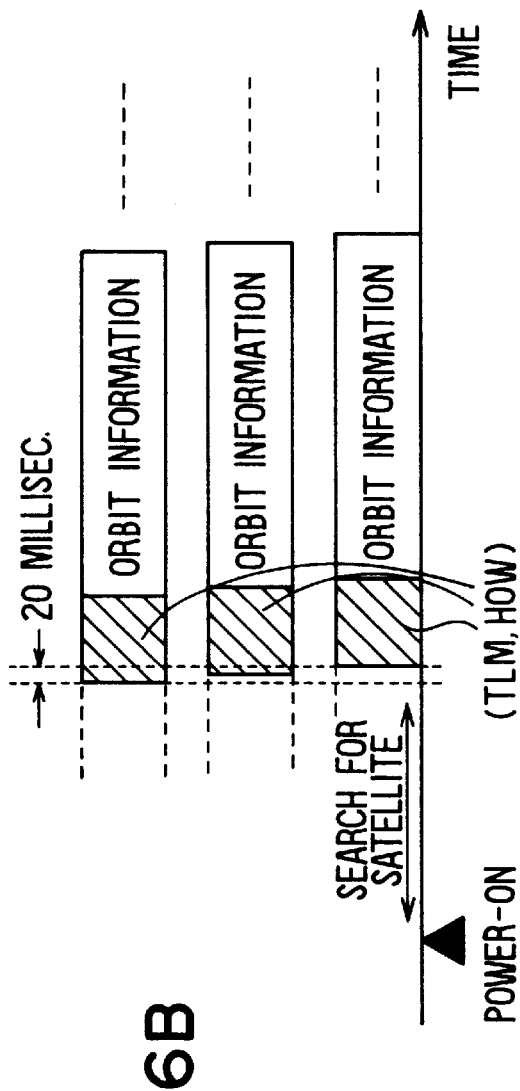

This distinction will be understood from FIGS. 6A and 6B.

In the conventional case, as shown in FIG. 6A, it takes at least 7.2 seconds to extract the synchronization data included in the sub-frames. This is because that the sub-frame appears every 6 seconds and it takes at least 1.2 seconds to extract two words, TLM and HOW.

According to the above embodiment which executes the satellite frame synchronization determination processing, as shown in FIG. 6B, it is checked whether the synchronization data included in the satellite data of a plurality of GPS satellites agree. Therefore, the time period of 6 seconds required in the conventional processing can be shortened to as short as a difference in time of transmissions of satellite data from a plurality of GPS satellites, although it takes 1.2 seconds to extract two words, TLM and HOW, as in the conventional processing. This time difference is about 20 milliseconds resulting in realization of the frame synchronization about 6 seconds earlier and shortening the time period required to start the positioning processing for calculating the position of the GPS receiver 2.

The above time difference of 20 milliseconds is calculated from the distance between a GPS satellite and a GPS receiver. The distance is about 20,200 kilometers to 25,800 kilometers. Variation in time s required for the radio signal to travel this differential distance of 5,600 kilometers is about 18.7 milliseconds. The variation in clock times of synchronization among GPS satellites are regulated to be less than 1 millisecond. As a result, a maximum difference in times of satellite data transmission from a plurality of GPS satellites results in 19.7 milliseconds.

In the above embodiment, the satellite frame synchronization determination processing is executed first, and then the conventional synchronization determination processing is executed when the satellite synchronization determination processing is not possible. Therefore, even in the case of impossibility of the satellite synchronization determination processing, the positioning processing can be started in the conventional manner.

In the above embodiment, it is theoretically possible to use only two GPS satellites for executing the satellite frame synchronization determination processing. However, it is preferred to use three or more GPS satellites determined as provisionally available for executing satellite frame synchronization determination processing from the standpoint of higher accuracy in establishing the synchronization.

The present invention should not be limited to the disclosed embodiment, but may be implemented in modified embodiments with out departing from the spirit of the invention.

What is claimed is:

1. A GPS receiver comprising:
acquisition means having a plurality of channels for acquiring a predetermined number of GPS satellites by searching for a corresponding GPS satellite by each of the channels;
time counting means for counting present time;
distance measuring means for extracting time information included in satellite data transmitted from the acquired GPS satellites, and measuring based on the extracted time information and the counted present time a distance of a present position from the GPS satellite which transmitted the satellite data;
positioning means for extracting detailed orbit information (Ephemeris) in the satellite data to calculate a position of the satellite and calculating a present position from the calculated satellite position and the measured distance;
memory means for storing the detailed orbit information so that the positioning means is enabled to execute a hot start in which the present position is calculated by using the stored detailed orbit information; and
synchronization means for executing satellite frame synchronization determination processing to establish a synchronization of the satellite data by checking for an agreement among predetermined data included in the satellite data transmitted from the plurality of GPS satellites when the plurality of GPS satellites, of which detailed orbit information is stored in the memory means, are acquired with in a predetermined time period from the time of executing the hot start.

2. A GPS receiver of claim 1, wherein:
when the plurality of GPS satellites corresponding to the stored detailed orbit information are acquired with in the predetermined time period but the predetermined data included in the satellite data of the acquired GPS satellites does not agree, the detailed orbit information stored in the memory means is erased and new detailed orbit information is acquired.

3. A GPS receiver comprising:
acquisition means having a plurality of channels for acquiring a predetermined number of GPS satellites by searching for a corresponding GPS satellite by each of the channels;
time counting means for counting present time;
distance measuring means for extracting time information included in satellite data transmitted from the acquired GPS satellites, and measuring based on the extracted time information and the counted present time a distance of a present position from the GPS satellite which transmitted the satellite data;
positioning means for extracting detailed orbit information (Ephemeris) in the satellite data to calculate a position of the satellite and calculating a present position from the calculated satellite position and the measured distance;
memory means for storing the detailed orbit information so that the positioning means is enabled to execute a hot start in which the present position is calculated by using the stored detailed orbit information; and
synchronization means for executing satellite frame synchronization determination processing to establish a synchronization of the satellite data by checking for an agreement among predetermined data included in the satellite data transmitted from the plurality of GPS satellites when the plurality of GPS satellites, of which detailed orbit information is stored in the memory means, are acquired with in a predetermined time period from the time of executing the hot start,
wherein the synchronization means executes a single-satellite frame synchronization determination processing when the acquisition means fails to acquire the plurality of GPS satellites the detailed orbit information of which are stored, the single-satellite frame synchronization determination processing being for checking for an agreement among predetermined data of a plurality of sub-frames included in the satellite data transmitted from a predetermined one of the satellites and for establishing a frame synchronization of the satellite data.

4. A GPS receiver of claim 1, wherein:
the acquisition means has at least four channels.

5. A GPS receiver of claim 1, wherein:
the acquisition means acquires at least three satellites for the satellite frame synchronization determination processing.

6. A GPS receiver of claim 1, wherein:
the memory means stores a general orbit data extracted from the satellite data and the present position calculated by the positioning means; and
the acquisition means searches for the GPS satellites based on the stored general orbit data, the present position and the counted time.

7. A method of processing GPS satellite data for position calculation by a GPS receiver, the method comprising:
searching for and acquiring a plurality of GPS satellites which are estimated to appear above the GPS receiver based on detailed orbit information previously stored in a memory of the GPS receiver;
receiving satellite data from the acquired plurality of GPS satellites by the GPS receiver;
extracting predetermined data included in a head part of each of the received satellite data;
checking for an agreement among the extracted predetermined data of the acquired plurality of GPS satellites; and starting positioning processing to calculate a position of the GPS receiver by using another predetermined data included in the received satellite data of the plurality of GPS satellites.

8. A method of claim 7, wherein:

each of the satellite data includes a plurality of sub-frames, and a data of the first sub-frame is extracted to be checked with respect to the agreement.

9. A method of claim 7, wherein:

the searching and acquiring are executed with respect to at least three GPS satellites.

10. A method of claim 9, further comprising:

extracting predetermined data included in a plurality of sub-frames of the received satellite data of one of the acquired GPS satellites when the agreement of the extracted predetermined data does not hold.

11. A GPS receiver comprising:

an antenna for receiving radio signals from a plurality of GPS satellites;

a data demodulator circuit for demodulating the radio signals;

a high frequency process circuit for processing the radio signals;

a central processing unit that receives the radio signals, makes calculations based upon the radio signals and issues commands to the data demodulator;

a real time clock for counting the present time;

a memory unit for storing programs for executing various processing of the central processing unit;

wherein the central processing unit calculates the distance and angle of elevation from the receiver to one of the plurality of satellites based upon the radio signals and the present time determined by the real time clock or general orbit information stored in the memory unit;

wherein the distance and angle of elevation is stored in the memory unit and the central processing unit further able to calculate a future distance and angle of elevation based upon the distance and angle of elevation stored in the memory unit;

wherein if the central processing unit is able to receive radio signals from the plurality of satellites for which distance and angle data is stored in a predetermined time period, the central processing unit further executes a satellite frame synchronization determination process to establish a synchronization of the radio signals of each of the plurality of satellites by checking for an agreement among predetermined data included in the radio signals; and wherein the central processing unit executes a single satellite frame synchronization process if the central processing unit is unable to receive radio signals from the plurality of satellites for which distance and angle data is stored.

* * * * *